(12) United States Patent
Van Nutt et al.

(10) Patent No.: US 7,317,576 B2
(45) Date of Patent: Jan. 8, 2008

(54) DICHROIC FILTERS ON FLEXIBLE POLYMER FILM SUBSTRATES

(75) Inventors: Charles Nicholas Van Nutt, Martinsville, VA (US); Rocco John Fizzano, Bassett, VA (US); Janet Sue Yeatts, Ruffin, NC (US); Steven Allen Barth, Martinsville, VA (US)

(73) Assignee: CPFilms, Inc.

( * ) Notice: Subject to any disclaimer, the term of this patent is extended or adjusted under 35 U.S.C. 154(b) by 0 days.

(21) Appl. No.: 11/379,774

(22) Filed: Apr. 21, 2006

(65) Prior Publication Data

US 2007/0247720 A1    Oct. 25, 2007

(51) Int. Cl.
  *G02B 1/10* (2006.01)
  *G02B 5/28* (2006.01)
  *G02B 27/00* (2006.01)

(52) U.S. Cl. ............... 359/588; 359/589; 359/587; 359/586; 359/577

(58) Field of Classification Search .......... 359/577, 359/583, 586, 587–589
See application file for complete search history.

(56) References Cited

U.S. PATENT DOCUMENTS

| | | | |
|---|---|---|---|
| 5,268,788 A | 12/1993 | Fox | |
| 5,282,121 A | 1/1994 | Bornhorst | |
| 5,486,878 A * | 1/1996 | Negishi et al. | 348/757 |
| 5,758,956 A | 6/1998 | Bornhorst | |
| 6,057,067 A * | 5/2000 | Isberg et al. | 430/7 |
| 6,441,551 B1 * | 8/2002 | Abe et al. | 313/503 |
| 6,549,338 B1 | 4/2003 | Wolverton | |
| 6,625,336 B2 * | 9/2003 | Challener et al. | 385/12 |
| 6,824,270 B2 | 11/2004 | Kim | |
| 6,859,323 B1 * | 2/2005 | Gasloli et al. | 359/589 |
| 2004/0066562 A1 | 4/2004 | Yamada | |
| 2004/0246580 A1 * | 12/2004 | Sahouani et al. | 359/490 |
| 2005/0213057 A1 | 9/2005 | Nakayama | |

* cited by examiner

Primary Examiner—Ricky Mack
Assistant Examiner—Jack Dinh
(74) Attorney, Agent, or Firm—Brenc Law

(57) ABSTRACT

Now, according to the present invention, dichroic filters are provided that incorporate a flexible polymer film substrate, such as poly(ethylene naphthalate), onto which a dielectric and/or reflective metal stack has been formed. Filters of the present invention are durable, flexible, and lightweight, and can be advantageously used in many specialty lighting applications.

1 Claim, 3 Drawing Sheets

DICHROIC FILTERS ON FLEXIBLE POLYMER FILM SUBSTRATES

FIELD OF THE INVENTION

The present invention is in the field of light filters in general, and, in particular, the present invention is in the field of dichroic interference filters used to selectively transmit desired wavelengths of light from a light source.

BACKGROUND

Devices that filter selected wavelengths of light are well known and have been in use for many years. Typically, a source of white light or light comprising components from wavelengths throughout the visible spectrum is filtered so as to transmit only the desired wavelengths. Among the various filters that are conventionally available for use as a light filter, absorption filters and interference filters are in common use.

Absorption filters are typically formed by imbuing a substrate with a dye that functions to absorb a given subset of visible light wavelengths. The result is that a portion of the light that is incident upon the absorption filter will be absorbed, and most of the remaining light will be transmitted through the filter. While effective, absorption filters are not ideally suited for many applications because the light that is absorbed is converted to heat, which tends to shorten the life of the dye, the filter substrate, or both. Absorption filters used in theatrical lighting, which are also known as "filter gels" or "gels", for example, are typically used for only a relatively short period of time before the intensity of the light being filtered results in the unacceptable degradation of the absorption filter.

Interference filters that filter visible light, which are also known as dichroic filters, utilize very thin, alternating layers of a material with a high refractive index and a material with a low refractive index deposited on a substrate such as a rigid glass substrate. These filters have little absorbance and transmit some wavelengths, while reflecting other wavelengths and causing destructive interference of out of phase wavelengths. This results in a different apparent color on each side of the filter (i.e. dichroic). Because dichroic filters do not absorb a significant amount of light incident upon them, they do not suffer from the same heat issues as absorption filters. Further, the deposited layers of materials typically resist physical degradation better than dyes, which often leads to longer and better performance. Unfortunately, many conventional dichroic filters are formed on glass substrates, which makes the filters relatively heavy, subject to breakage, and relatively costly to produce and distribute compared to gel filters.

What are needed in the art are improved optical filters that can be used to filter light without degrading due to heat buildup or dye instability, and that also can be produced, handled, and/or distributed more easily and safely than glass based filters.

SUMMARY OF THE INVENTION

Now, according to the present invention, dichroic filters are provided that incorporate a flexible polymer film substrate, such as poly(ethylene naphthalate), onto which a dielectric and/or reflective metal stack has been formed. Filters of the present invention are durable, flexible, and lightweight, and can be advantageously used in many specialty lighting applications.

DETAILED DESCRIPTION

The present invention provides dichroic filters that can be used in a wide variety of applications, including, for example, as optical filters for use in theatre productions and as color filters for any conventional lighting application.

Dichroic filters of the present invention comprise a flexible polymer film substrate, as will be described in detail, below, onto which alternating layers of two dielectric and/or reflective metal materials with disparate refractive indices are deposited, as will also be described in detail, below.

Dichroic filters of the present invention transmit only a subset of wavelengths in the visible spectrum of wavelengths, which results, for example, in the passing of colored light from a white light source. Due to their special construction, filters of the present invention reflect selective areas of the spectrum.

In various embodiments of the present invention, a flexible polymer film substrate is provided as a base material onto which at least five alternating layers of two dielectric and/or reflective metal materials are deposited. In various embodiments, 7, 10, 15, or 20 such layers, for example, can be used. The number of layers can be chosen based on the desired light filtering characteristics of the filter, as is well known in the art.

Figure 3:
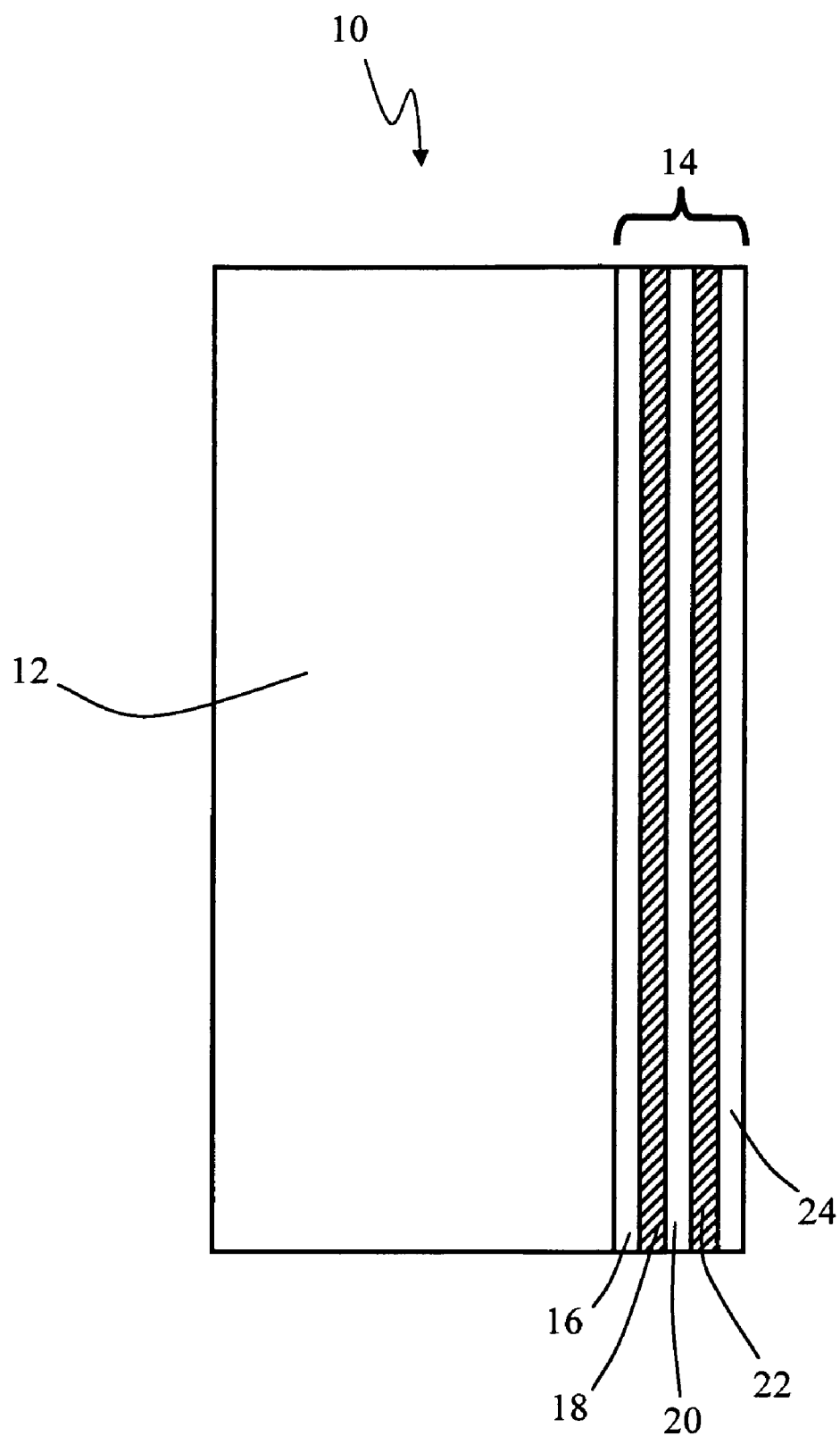
FIG. 3 is a schematic representation of a dichroic filter of the present invention.

FIG. 3 is a schematic representation of a dichroic filter of the present invention, which is shown generally at 10. As shown in FIG. 3, the dichroic filter 10 comprises a flexible polymer film 12 having disposed thereon a stack 14. The stack comprises a first layer 16, third layer 20, and fifth layer 24 comprising a first dielectric or reflective metal and a second layer 18 and fourth layer 22 comprising a second dielectric or reflective metal.

Flexible polymer film substrates of the present invention can include one or more primer layers, as are known in the art, to facilitate proper adhesion of the dielectric and/or reflective metal layers to the flexible polymer film substrate.

In various embodiments of the present invention, a flexible polymer film substrate having dielectric and/or reflective metal layers deposited thereon incorporates a second polymer film on the top layer of dielectric and/or reflective metal. This second layer functions to protect the dielectric and/or reflective metal layers from mechanical damage that could otherwise cause degradation of the interference filter. The second polymer film can comprise any suitable material, as detailed below, and can be the same as or different from the flexible polymer film substrate. The second polymer film can be adhered to the dielectric and/or reflective metal layers with any suitable adhesive, as is known in the art. In various embodiments a spray on silicone adhesive is used. In other embodiments, silicone adhesive can be applied using other means, such as various gravure and slot die coating techniques. In various embodiments the adhesive used is a high temperature adhesive, and, in particular, is a high temperature silicone adhesive.

Flexible interference filters of the present invention can further include a layer of a pressure sensitive adhesive and, optionally, a release liner, disposed on the outer surface of one of the polymer films, opposite the stack, with the first polymer film preferred. In these embodiments, the filters can be applied to any desired surface, including, for example, a frame, window, glass panel, plastic panel, or other suitable support. The pressure sensitive adhesive can be any suitable adhesive, and, in some embodiments, the adhesive is a silicone pressure adhesive. The adhesive itself can be a removable adhesive or a permanent adhesive, and can be formed to completely cover the polymer film or only a sub-portion thereof.

Flexible interference filters of the present invention are useful in a wide variety of light filtering applications. As a lightweight film, these filters can be used as a direct replacement for standard gel filters. Further, because filters of the present invention are flexible, they can be formed to match the curvature of a light source, which eliminates or reduces gradients of colors that can occur in conventional, flat filters for which distances between the typically curved light sources and flat glass are not constant. Filters can be formed to a non-planar shape at the time of manufacture or at the point of application, as desired.

In other embodiments, filters of the present invention can be combined to form a multiple filter roll or wheel that is useful when the ability to quickly change filters is desired. Rolls and wheels can easily be combined with an automatic control device to allow for the rapid and automatic switching among several filters in the roll or wheel.

Polymer Film

Polymer films of the present invention can be any suitable thermoplastic film that is used in the performance film arts. In various embodiments, the thermoplastic film can comprise polycarbonates, acrylics, nylons, polyesters, polyurethanes, polyolefins such as polypropylene, cellulose acetates and triacetates, vinyl acetals, such as poly(vinyl butyral), polyimide, vinyl chloride polymers and copolymers and the like, or another plastic suitable for use in a performance film, for example, PEEK® (polyetheretherketone). In various embodiments, the thermoplastic film is a polyester film, for example poly(ethylene naphthalate). In various embodiments, the thermoplastic film is poly(ethylene terephthalate).

In various embodiments the thermoplastic film can have a thickness of 0.012 millimeters to 0.40 millimeters, and preferably 0.07 millimeters to 0.17 millimeters.

The thermoplastic films, in some embodiments, are optically transparent (i.e. objects adjacent one side of the layer can be comfortably seen by the eye of a particular observer looking through the layer from the other side). In various embodiments, the thermoplastic film comprises materials such as re-stretched thermoplastic films having the noted properties, which include polyesters. In various embodiments, poly(ethylene naphthalate) is used that has been biaxially stretched to improve strength, and has been heat stabilized to provide low shrinkage characteristics when subjected to elevated temperatures (e.g. less than 2% shrinkage in both directions after 30 minutes at 150° C.).

Dielectric and Reflective Layers

The alternating dielectric and/or reflective metal layers of the present invention can comprise any suitable high/low pair, as is known in the art. Useful pairs include titanium dioxide and silicon dioxide and zinc sulfide and magnesium fluoride. High index materials can include, but are not limited to: niobium pentoxide, tantalum pentoxide, and reflective metals such as silver and alloys, copper and alloys, and aluminum and alloys.

In a preferred embodiment, the high/low pair is titanium dioxide and silicon dioxide. The alternating dielectric and/or reflective metal layers of the present invention can be formed at the appropriate thicknesses so as to provide the desired light filtration. In various embodiments, the alternating dielectric and/or reflective metal layers have a total thickness of 10 to 120 nanometers.

The alternating dielectric and/or reflective metal layers of the present invention can have any suitable high/low combination of refractive indices, for example, greater than 2 and less than 1.8 and greater than 2.2 and less than 1.6.

Alternating dielectric and/or reflective metal layers of the present invention can be formed using any suitable method, as are known in the art, for example, with physical vapor deposition such as "sputtering", electron beam evaporation, and variations thereof. In various embodiments, sputtering is the preferred method of fabrication. Exemplary dielectric and/or reflective metal layer forming techniques are well known in the art and include, for example, those disclosed in U.S. Pat. Nos. 2,379,790, 6,859,323, and "Thin Film Optical Filters", 3$^{rd}$ Edition, by H. Angus Macleod.

EXAMPLES

Example 1

A dichroic filter is prepared having the following configuration—

Base Film—TK20 0.13 millimeters poly(ethylene napthalate) film (SKC Incorporated, Korea).

| | Stack layers - | |
|---|---|---|
| Layer Number | Thickness | Material |
| Layer 1 | 55 nm | TiO$_2$ |
| Layer 2 | 95 nm | SiO$_2$ |
| Layer 3 | 70 nm | TiO$_2$ |
| Layer 4 | 95 nm | SiO$_2$ |
| Layer 5 | 30 nm | TiO$_2$ |
| Layer 6 | 95 nm | SiO$_2$ |
| Layer 7 | 65 nm | TiO$_2$ |
| Layer 8 | 90 nm | SiO$_2$ |
| Layer 9 | 60 nm | TiO$_2$ |
| Layer 10 | 45 nm | SiO$_2$ |
| Layer 11 | 70 nm | TiO$_2$ |
| Layer 12 | 85 nm | SiO$_2$ |
| Layer 13 | 65 nm | TiO$_2$ |

Laminating Adhesive—Dow Corning 7657 adhesive with Syloff 4000 catalyst (available from Dow Corning).

Protective Polymer—25.4 micron thickness poly(ethylene terephthalate).

Figure 1:
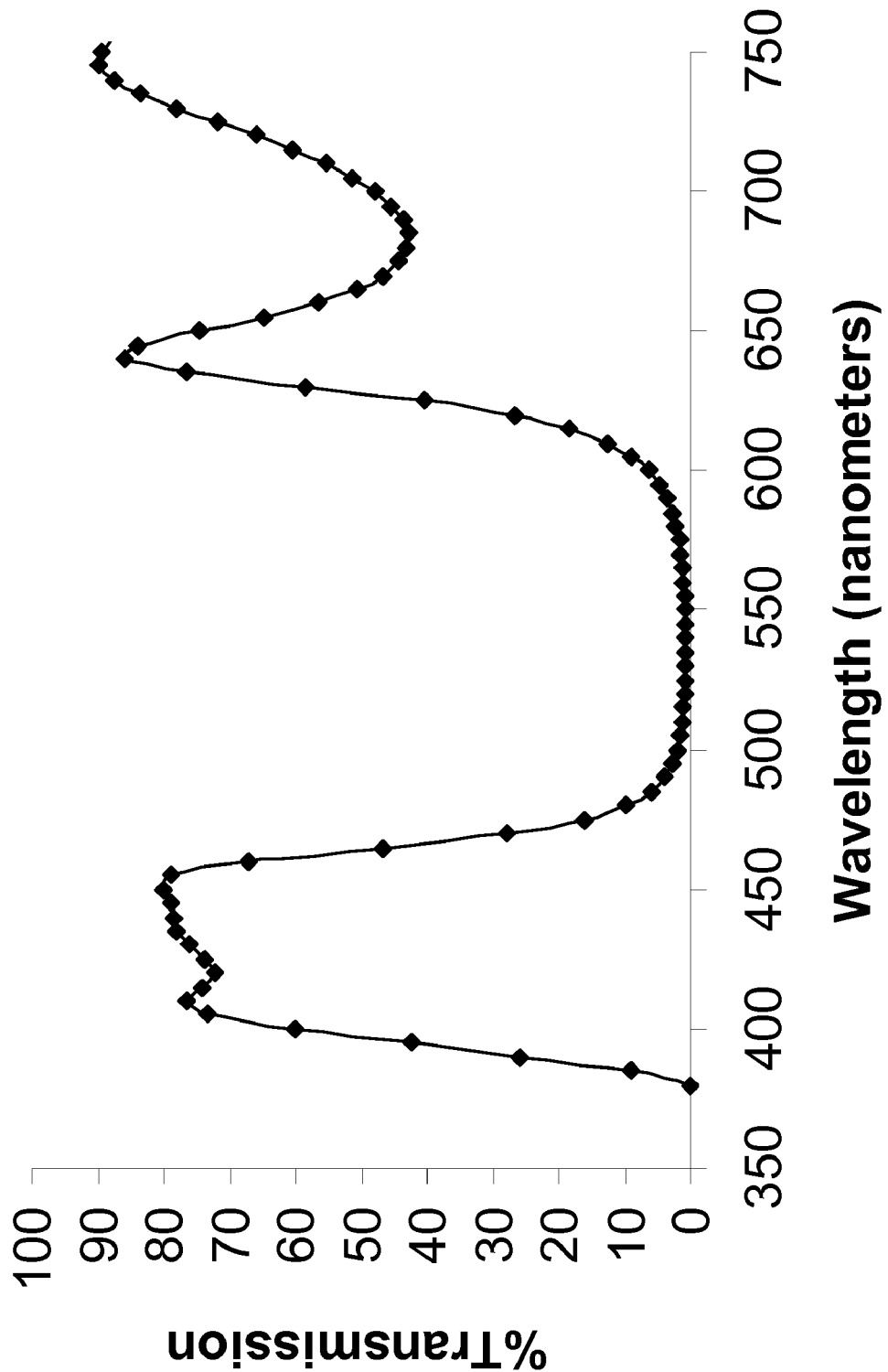
FIG. 1 is a graph of a light transmission spectrum of the present invention.

The light transmission characteristics of the resulting film is shown in FIG. 1.

Example 2

A dichroic filter is prepared having the following configuration—

Base Film—TK20 0.13 millimeters poly(ethylene naphthalate) (SKC Incorporated, Korea).

Stack layers -

| Layer Number | Thickness | Material |
|---|---|---|
| Layer 1 | 10 nm | $TiO_2$ |
| Layer 2 | 25 nm | Silver-alloy |
| Layer 3 | 95 nm | $TiO_2$ |
| Layer 4 | 25 nm | Silver-alloy |
| Layer 5 | 110 nm | $TiO_2$ |
| Layer 6 | 15 nm | Silver-alloy |
| Layer 7 | 75 nm | $TiO_2$ |

Laminating Adhesive—Dow Corning 7657 adhesive with Syloff 4000 catalyst (available from Dow Corning).

Protective Polymer—25.4 micron thickness poly(ethylene terephthalate).

Figure 2:
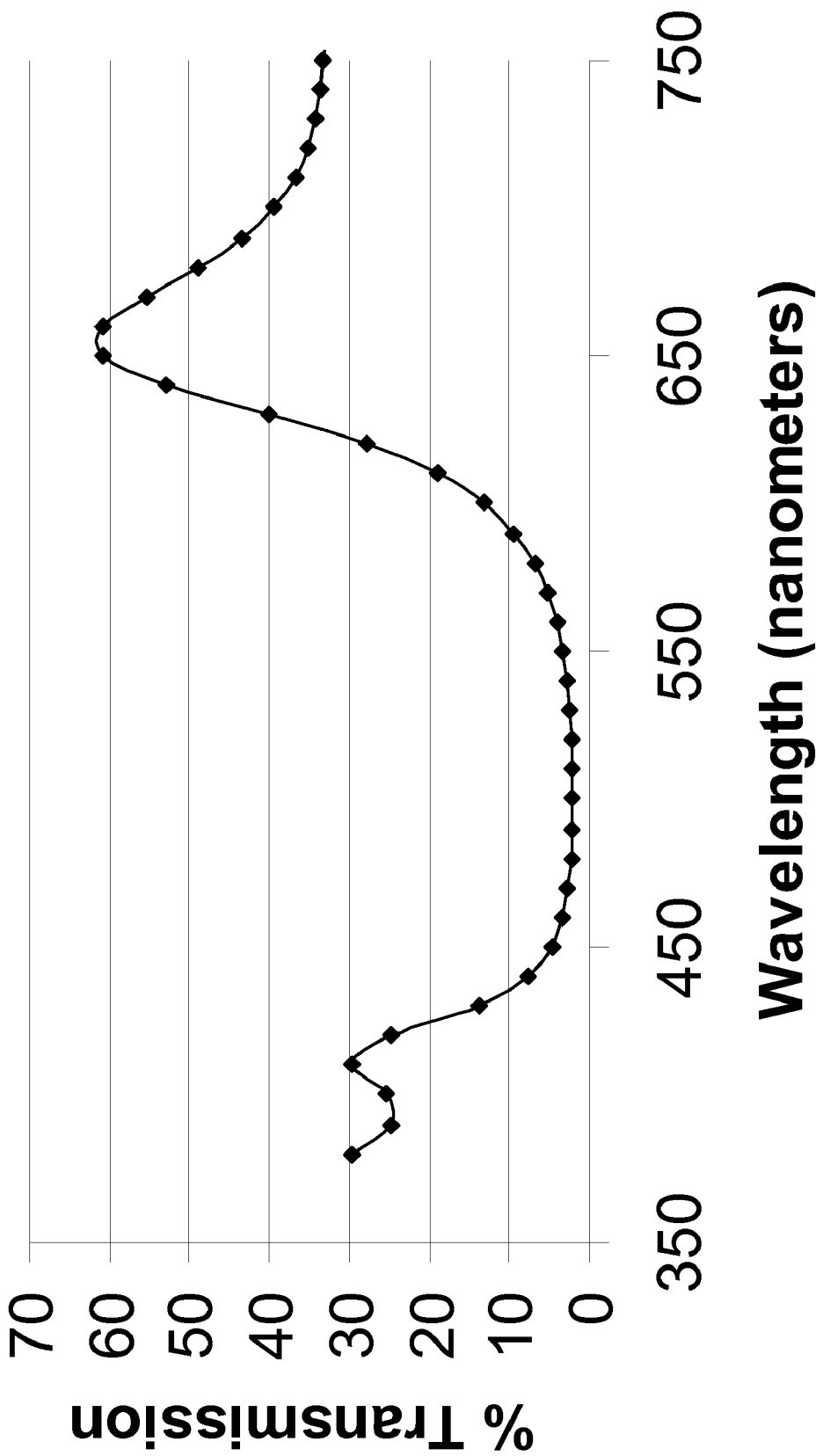
FIG. 2 is a graph of a light transmission spectrum of the present invention.

The light transmission characteristics of the resulting film is shown in FIG. 2.

By virtue of the present invention, light, flexible, dichroic filters are provided that effectively filter light and resist degradation from heat buildup, which allows for longer filter life and easier handling.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout.

Any figure reference numbers given within the abstract or any claims are for illustrative purposes only and should not be construed to limit the claimed invention to any one particular embodiment shown in any figure.

Unless otherwise noted, drawings are not drawn to scale.

Each reference, including journal articles, patents, applications, and books, referred to herein is hereby incorporated by reference in its entirety.

We claim:

1. A dichroic filter comprising:
   a polymer film substrate comprising poly(ethylene napthalate);
   a stack formed on said substrate, wherein said stack comprises at least 5 alternating layers of titanium dioxide and silicon dioxide and wherein said dichroic filter transmits only a subset of wavelengths in the visible spectrum of wavelengths.

* * * * *